United States Patent [19]
Martinelli

[11] Patent Number: 5,301,503
[45] Date of Patent: Apr. 12, 1994

[54] VEHICLE INTERNAL COMBUSTION ENGINE EXHAUST SYSTEM

[75] Inventor: Paolo Martinelli, Modena, Italy

[73] Assignee: Ferrari S.P.A., Modena, Italy

[21] Appl. No.: 917,899

[22] Filed: Jul. 24, 1992

[30] Foreign Application Priority Data

Jul. 26, 1991 [IT] Italy ............................ 000593 A/91

[51] Int. Cl.$^5$ .............................................. F01N 3/28
[52] U.S. Cl. ........................................ 60/288; 60/312
[58] Field of Search ................... 60/288, 312; 181/239, 181/240, 254, 265, 268, 272, 296

[56] References Cited

U.S. PATENT DOCUMENTS

| | | | |
|---|---|---|---|
| 3,282,046 | 11/1966 | Walker | 60/288 |
| 3,943,710 | 3/1976 | Lange | 60/288 |
| 4,926,636 | 5/1990 | Tadokoro | 60/312 |
| 5,014,817 | 5/1991 | Takato | 60/312 |

FOREIGN PATENT DOCUMENTS

| | | |
|---|---|---|
| 0329165 | 8/1989 | European Pat. Off. . |
| 8702009 | 7/1987 | Fed. Rep. of Germany . |
| 2534969 | 4/1984 | France .................. 60/312 |
| 56-10601 | 8/1981 | Japan . |
| 59-74325 | 4/1984 | Japan . |
| 200316 | 9/1986 | Japan .................. 60/299 |
| 1-195908 | 8/1989 | Japan . |

*Primary Examiner*—Douglas Hart
*Attorney, Agent, or Firm*—Arkwright & Garvey Shlesinger

[57] ABSTRACT

A vehicle internal combustion engine exhaust system featuring two different exhaust routes to which the exhaust gas is directed selectively by an on-off device; the system also comprising a device for comparing parameters, consisting in engine speed, the opening angle of the throttle, and the vacuum inside the intake manifold and/or engine load, with respective predetermined values, for opening the on-off device upon the above parameters reaching the aforementioned predetermined values, and so selectively enabling the exhaust gas to flow along both the exhaust routes.

8 Claims, 4 Drawing Sheets

VEHICLE INTERNAL COMBUSTION ENGINE EXHAUST SYSTEM

BACKGROUND OF THE INVENTION

The present invention relates to a vehicle internal combustion engine exhaust system.

The performance of an internal combustion engine in terms of output and the manner in which this is supplied (i.e. the characteristic curve of the engine) is known to depend, not only on the engine itself, but also on the exhaust system, the characteristics of which in turn depend on the type and degree of noise attenuation required.

At the design stage, therefore, a trade-off is invariably involved between the characteristics of the engine and the exhaust system, and which generally results in impaired performance of the engine, particularly at high speed, due to the conflicting exhaust system design features required for achieving given performance characteristics at both high and low engine speeds. On catalyzed engines of high-performance (so-called Grand Touring) vehicles, operation of the catalyst has also been found to be impaired at high engine speed, due to the fuel supply system supplying a "richer" air/fuel mixture, i.e. having a lower dilution coefficient.

SUMMARY OF THE INVENTION

It is an object of the present invention to provide an internal combustion engine exhaust system enabling optimum operation of the system as a function of engine speed.

According to the present invention, there is provided a vehicle internal combustion engine exhaust system, characterized by the fact that it comprises, along the exhaust manifold of said engine, at least two exhaust routes; and means for selectively and predominantly directing the exhaust gas along one of said exhaust routes alongside a variation in engine speed.

BRIEF DESCRIPTION OF THE DRAWINGS

A preferred non-limiting embodiment of the present invention will be described by way of example with reference to the accompanying drawings, in which.

DETAILED DESCRIPTION OF THE INVENTION

Figure 1:
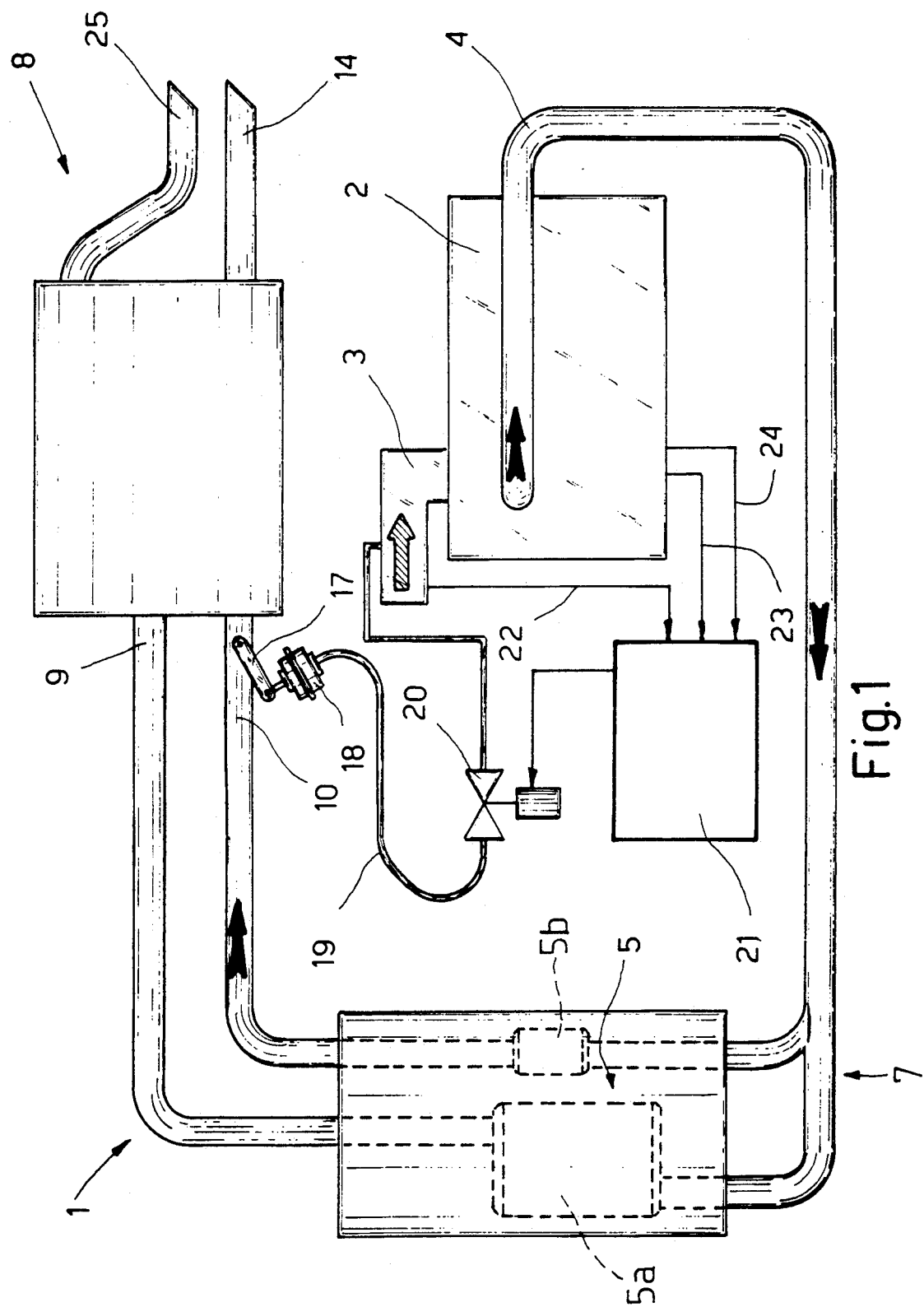
FIG. 1 shows, partly in block form, an exhaust system in accordance with the teachings of the present invention.
Figure 2:
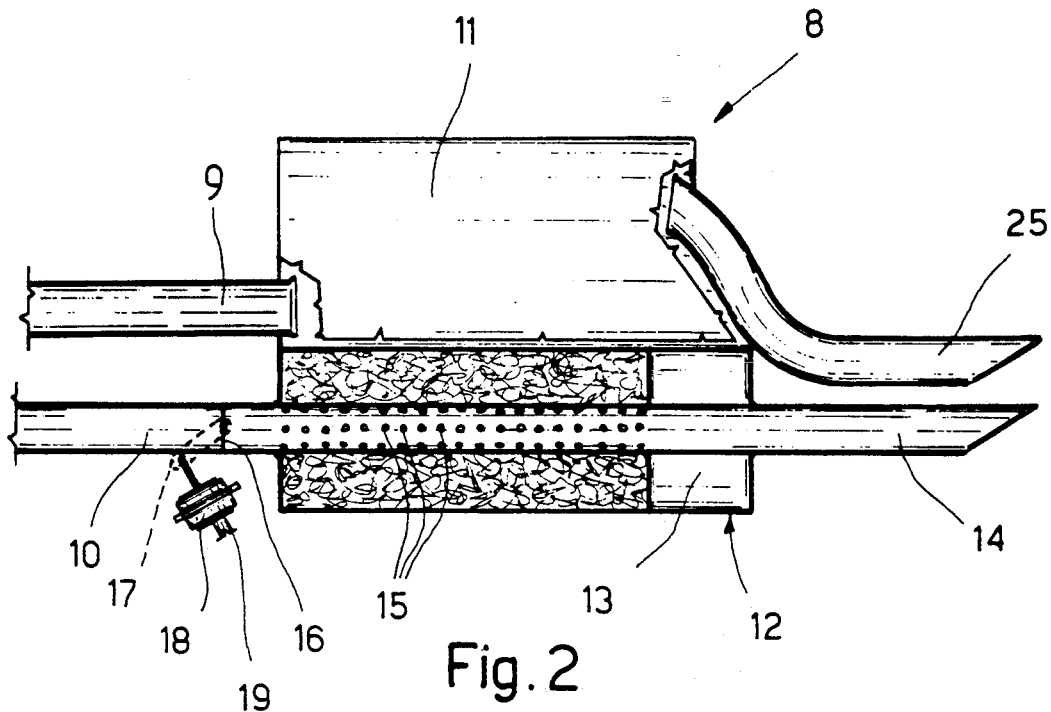
FIG. 2 shows a partially sectioned view of a detail in the FIG. 1 system

With reference to FIGS. 1 and 2, number 1 indicates an exhaust system for an internal combustion engine 2 (shown schematically in block form) of a vehicle (not shown).

Engine 2 is supplied with air and fuel via intake manifold 3, and discharges the burnt gases via exhaust manifold 4, which communicates with a first exhaust control unit 5 preferably consisting of two so-called "catalytic mufflers" 5a, 5b arranged parallel to each other along respective pipes 9, 10 to which manifold 4 is connected by two-way end 7. Downstream from unit 5, pipes 9 and 10 also present a silencer indicated as a whole by 8.

As shown by way of example, pipes 9 and 10 provide for feeding the exhaust gas into respective silencers or sections 11 and 12 forming part of silencer 8 and having parallel inlets. Silencers 11 and 12 may consist of two physically separate devices, as in the non-limiting example shown, or simply form part of one device through which the exhaust gas is fed along different routes.

Silencer 11 is a known interference type, e.g. consisting of a number of Helmholtz resonating chambers and which therefore requires no further description; while silencer 12 is a known so-called dissipative type substantially comprising a hollow cylindrical body 13 through which pipe 10 is fitted coaxially, and the end faces of which ar connected in fluidtight manner to respective portions of pipe 10. Pipe 10 presents an end portion or outlet pipe 14 extending outwards of body 13, and, inside body 13, presents a number of equally-spaced radial through holes 15. Body 13 is filled with metal wool or any other agglomerate of fibrous high-temperature-resistant material.

Upstream (in relation to the flow direction of the exhaust gas) from the point at which pipe 10 enters body 13, pipe 10 houses an on-off means consisting of a throttle valve 16 operated, via a connecting rod 17, by a pneumatic actuator 18 as described later on. Actuator 18 communicates with intake manifold 3 via a conduit 19 and a normally-closed solenoid valve 20 controlled by a known processing system 21 (described later on) for processing signals supplied respectively over electric lines 22, 23 and 24 and respectively indicating the vacuum inside intake manifold 3 and the speed and spark lead of engine 2.

As explained later on, processing system 21 provides for comparing at least one of the above parameters—engine speed, throttle opening angle and the vacuum inside intake manifold 3 (i.e. the load of engine 2)—with respective predetermined values memorized in table form, and preferably provides for simultaneously processing all the above parameters for reconstructing in real time the actual instantaneous load curve of engine 2, which is compared with respective theoretical curves mapped in the ROM memory of system 21. This may be specifically designed to control silencer 8, or consist, for example, of the processing system on the vehicle electronic injection and/or ignition system.

In actual use (FIGS. 1 and 2), as long as one or all of the parameters processed by system 21 remain within predetermined values, i.e. indicating normal or at any rate less than maximum power operation of engine 2, with no sharp acceleration in vehicle speed, solenoid valve 20 and, consequently, throttle valve 16 are maintained closed by system 21, and the exhaust gas flows through muffler 5 and silencer or silencer section 11.

Conversely, upon the above parameters reaching predetermined threshold values, i.e. indicating maximum power demand of engine 2, for example, for effecting a sharp acceleration in vehicle speed, system 21 opens solenoid valve 20 so as to connect intake manifold 3 to actuator 18, and so operate actuator 18 as to open throttle valve 16. That is, when subjected to a vacuum, actuator 18, which is of known type, provides for moving connecting rod 17 and so rotating throttle valve 16, which may incidentally be a mushroom type as opposed to the throttle valve in the example shown.

When throttle valve 16 is opened, the exhaust gas from engine 2 flows partly through silencer 12, which, being a dissipative type, produces a smaller load loss than silencer 11, thus reducing the exhaust back pressure of engine 2 as compared with that produced when valve 16 is closed. By virtue of assisting exhaust as described above, the output of engine 2 and consequently also instantaneous acceleration and response are thus improved as compared with known silencers.

Figure 3:
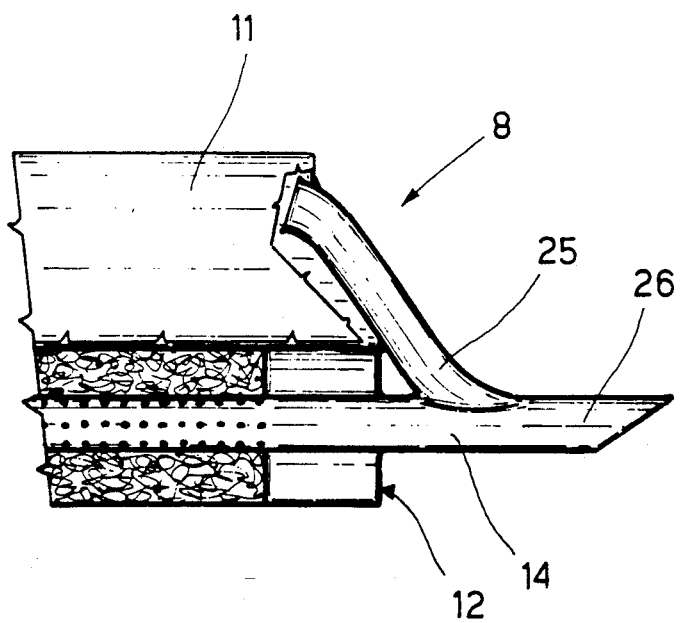
FIG. 3 shows a variation of the FIG. 2 detail.

In FIG. 2, outlet pipes 14 and 25 of silencers 12 and 11 are separate, whereas, in the FIG. 3 variation, they are so connected that the exhaust gas flows out of silencer 8 along a single end pipe 26.

Exhaust system 1 according to the present invention thus provides for optimum performance of engine 2 by enabling greater output at high engine speeds, while at the same time maintaining a more than acceptable degree of noise attenuation, by virtue of the sound waves requiring silencer or silencer section 11 being produced predominantly at engine speeds well below those corresponding to maximum output of the engine. In other words, the present invention provides for dynamically adapting the characteristics of silencer 8 to the operating conditions of engine 2, thus preventing output at high engine speed from being impaired solely for the purpose of attenuating noise at medium-low engine speeds, as with known exhaust systems.

Figure 4:
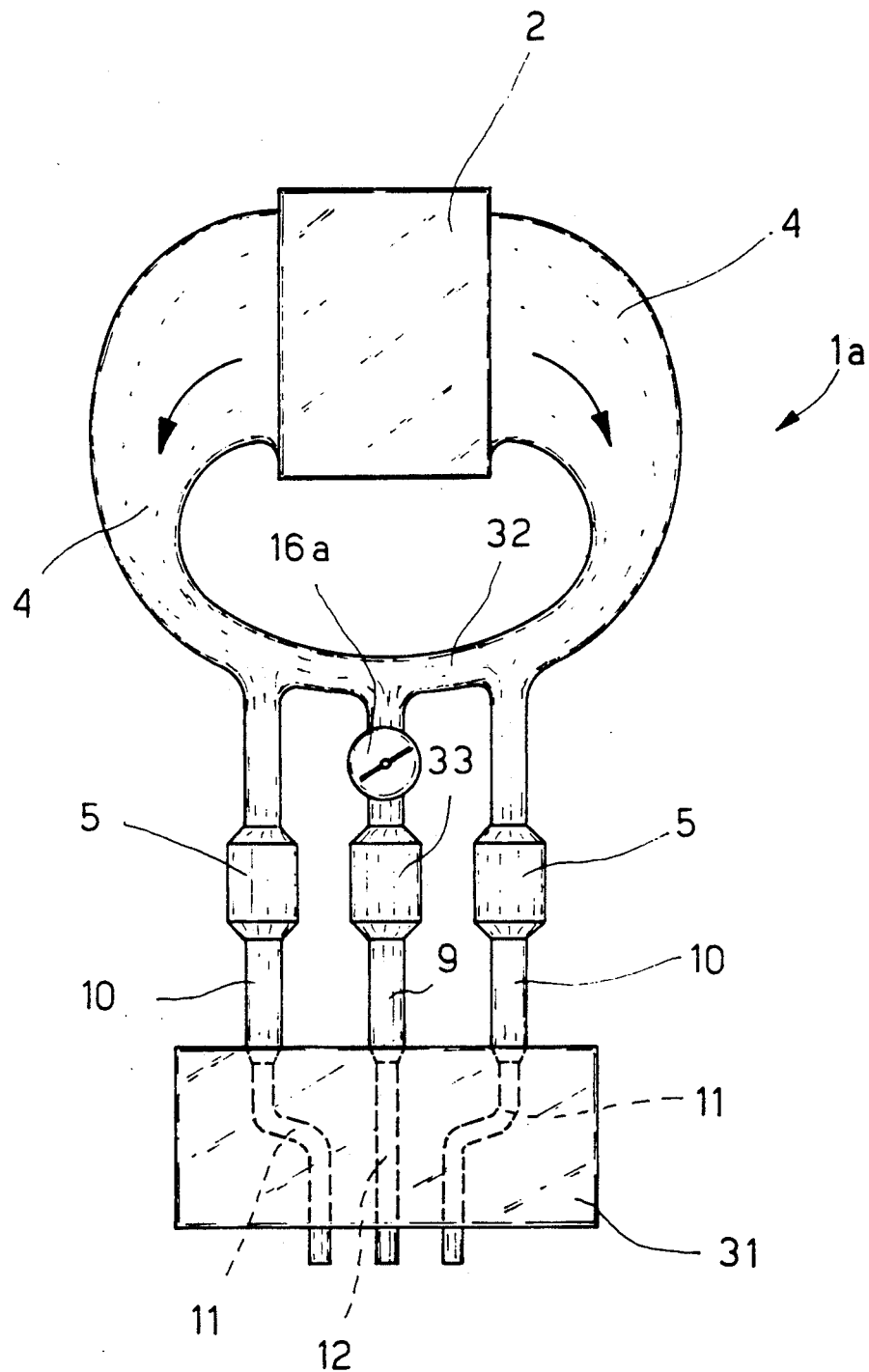
FIGS. 4 and 5 show block diagrams of two preferred variations of the FIG. 1 system.
Figure 5:
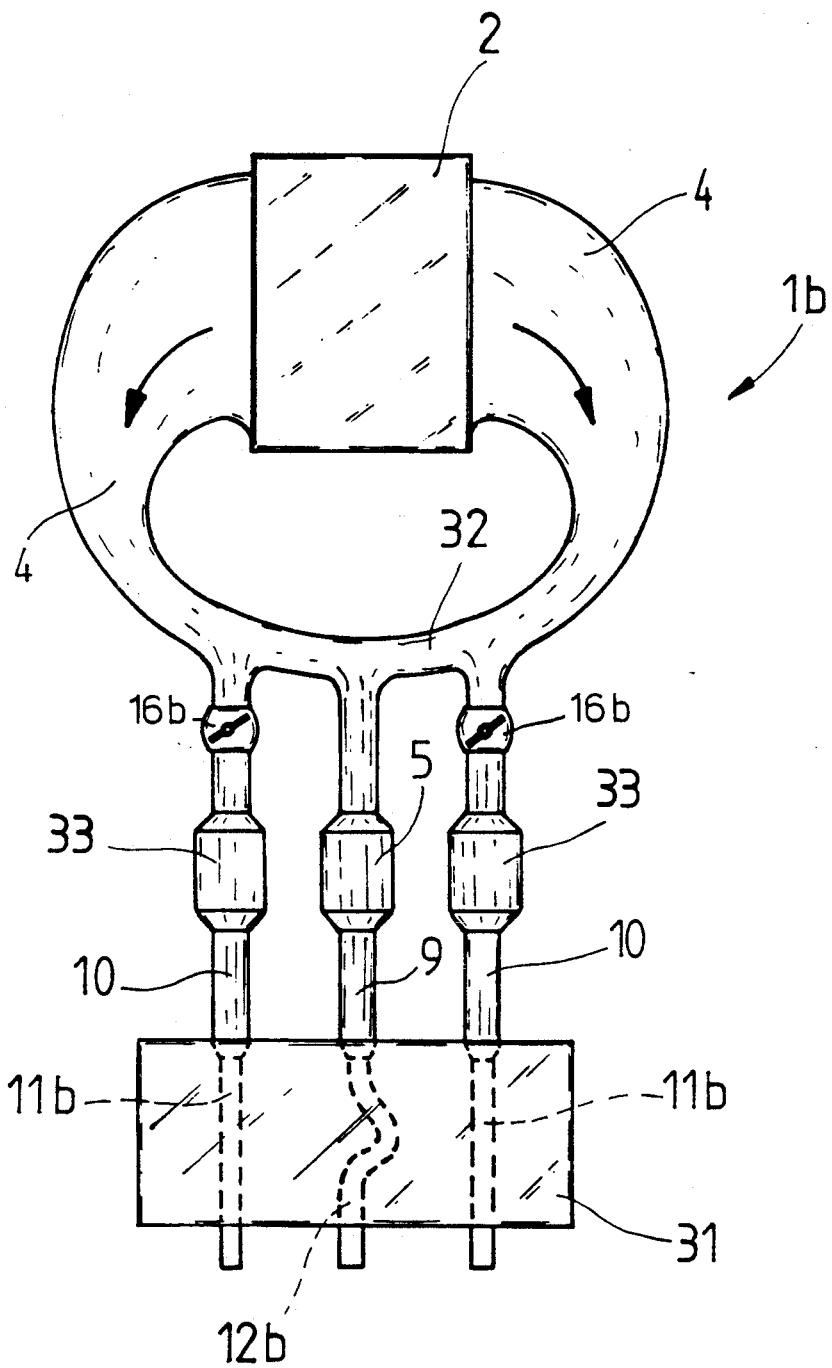

1a and 1b in FIGS. 4 and 5 indicate two preferred variations of exhaust system 1 any details of which similar to those already described are indicated using the same numbering system. More specifically, engine 2 presents two separate, opposed exhaust manifolds 4, each connected to a respective exhaust pipe 10 along which is provided a catalyst o known catalytic muffler 5. Downstream from catalysts 5, pipes 10 are connected to respective silencer sections 11, 11b of the same type, formed along different paths inside a transverse muffler 31 at the rear of the vehicle. Despite being separate (one for each manifold 4), the two silencer sections 11 (or 11b in the case of 1b) present the same construction. The exhaust paths of manifolds 4, defined by respective pipes 10 and connected accessories (catalysts 5 and silencer sections 11, 11b) are symmetrical, and so present the same exhaust back pressure as regards engine 2.

According to the present invention, system 1a also comprises a further exhaust pipe 9 located between and branch connected to pipes 10 by a T fitting 32. Downstream from fitting 32, provision is made for an on-off throttle valve 16a as on system 1, and controlled in the same way by a processing system 21 and a pneumatic actuator 18 (not shown). Downstream from valve 16a, pipe 9 presents a further catalyst 33 optimized internally for processing the exhaust ga of rich air-fuel mixtures, i.e. having a low dilution ratio. Downstream from catalyst 33, pipe 9 is also connected to muffler 31 and more specifically to silencer section 12 having a lower load loss and different noise damping characteristics as compared with sections 11. Valve 16a may be located, with no effect on operation, at any point along pipe 9, from fitting 32 to the inlet of muffler 31, and with catalyst 33 located indifferently up- or downstream from valve 16a.

System 1b in FIG. 5, on the other hand, also presents a central pipe 9 connected to pipes 10 and manifolds 4 by a T fitting 32, but with two identical valves 16b on respective pipes 10 as opposed to a single valve 16a on pipe 9 in system 1a. Pipes 10 also present respective rich mixture catalysts 33, while central pipe 9 presents a traditional catalyst 5.

Valves 16a and 16b are so designed that, when actuator 18 (not shown) by which they are controlled is de-activated (i.e. under normal operating conditions of the engine), they present a small opening angle enabling the exhaust gas to flow partially from manifolds 4 into pipe 9 (FIG. 4) or pipes 10 (FIG. 5), thus heating and maintaining an efficient temperature of catalyst/s 33. When partially open, in fact, valve 16a directs the exhaust gas predominantly along pipes 10 and through respective catalysts 5 and silencer sections 11 (FIG. 4), whereas valves 16b direct it predominantly along central pipe 9 and through respective catalyst 5 and silencer section 12b.

With reference to FIG. 4, when engine 2 is operated at high speed, e.g. when accelerating sharply, valve 16a, which is controlled in exactly the same way as 16, is opened fully so as to enable the exhaust gas to flow freely along pipes 10 and central pipe 9. As pipe 9, however, is connected to a silencer section 12 having a lower load loss as compared with sections 11, most of the exhaust gas will flow along pipe 9, which, together with catalyst 33 and silencer section 12, defines a lower back pressure exhaust route, i.e. along which the gas encounters least resistance.

Similarly (FIG. 5), when engine 2 is operated at high speed, valves 16b are opened fully so that the exhaust gas flows predominantly along lateral pipes 10, by virtue of the latter being connected to silencer sections 11b having a lower exhaust back pressure as compared with 12b to which central pipe 9 is connected. In both the FIG. 4 and 5 cases, therefore, under high-speed operating conditions of the engine, the exhaust gas is directed predominantly along the exhaust route of least resistance, thus optimizing output of engine 2 at high engine speed, as in the case of system 1. In addition, however, and by no means least importantly, at high engine speed, the exhaust gas is directed predominantly to the catalyst/s 33 specifically designed for the type of gas produced under such conditions, thus providing for more effective processing than that achievable, at low engine speed, by feeding most of the gas through weak-mixture catalysts 5.

In addition to the above advantages (greater output of engine 2 and improved processing of the exhaust gas at high engine speed), the present invention also provides for more or less completely mixing the exhaust gas from manifolds 4, thus further reducing pollution at high engine speed, and ensuring a fine balance of the exhaust back pressures of the two manifolds 4.

I claim:

1. An exhaust system for an internal combustion engine, comprising:
 a) an exhaust manifold having first and second ends, said first end for being connected to the engine;
 b) first and second exhaust passageways each having first and second ends;
 c) respective first ends of said first and second passageways being connected to said exhaust manifold second end and communicating therewith;
 d) respective second ends of said first and second passageways for directing the exhaust gas to the atmosphere;
 e) said first and second passageways having first and second silencers, respectively, and said first silencer having a higher loss load than said second silencer;
 f) said first and second passageways including first and second catalysts, respectively, for processing the exhaust gas and said second catalyst being adapted to process exhaust gas of rich air/fuel mixtures; and g) means for predominantly directing the exhaust gas to one of said first and second passageways in response to a variation of at least one engine performance parameter.

2. An exhaust system as in claim 1, wherein:
a) said directing means includes a normally closed valve disposed in said second passageways; and
b) means for opening said valve in response to the variation of the at least one engine performance parameter.

3. An exhaust system as in claim 2, wherein:
a) said valve is adapted to permit a small portion of the exhaust gas to pass through when in the closed position thereby to heat said second catalyst.

4. An exhaust system as in claim 2, wherein:
a) said directing means includes a processor for comparing the at least one engine performance parameter against a predetermined threshold value; and
b) said opening means is operably associated with said processor such that said valve is opened when the at least one engine performance parameter exceeds the predetermined threshold value.

5. An exhaust system as in claim 4, wherein:
a) said opening means includes a pneumatic actuator for communicating with the intake manifold of the engine and operably associated with said valve;
b) a normally closed solenoid valve disposed between said pneumatic actuator and the intake manifold and operably associated with said pneumatic actuator; and
c) said solenoid valve is operably associated with said processor such that said solenoid valve is opened thereby to operate said pneumatic actuator when the at least one engine performance parameter exceeds the threshold value.

6. An exhaust system as in claim 1, wherein:
a) said second ends of said first and second passageways merge into a single passageway.

7. An exhaust system as in claim 1, wherein:
a) said first silencer is of an interference type.

8. An exhaust system as in claim 1, wherein:
a) said second silencer is of a dissipative type.

* * * * *

UNITED STATES PATENT AND TRADEMARK OFFICE
CERTIFICATE OF CORRECTION

PATENT NO. : 5,301,503
DATED : April 12, 1994
INVENTOR(S) : PAOLO MARTINELLI

It is certified that error appears in the above-indentified patent and that said Letters Patent is hereby corrected as shown below:

On the title page, item (30): The Foreign Application Data should read--TO91A 000593--.

Signed and Sealed this

Ninth Day of August, 1994

Attest:

BRUCE LEHMAN

Attesting Officer

Commissioner of Patents and Trademarks